(No Model.)

P. LOCKIE.
CLOTHES DRIER.

No. 328,852. Patented Oct. 20, 1885.

Witnesses:
L. F. Gardner
J. W. Garner

Inventor:
Peter Lockie,
per
J. A. Lehmann,
Atty.

UNITED STATES PATENT OFFICE.

PETER LOCKIE, OF ROCHESTER, NEW YORK.

CLOTHES-DRIER.

SPECIFICATION forming part of Letters Patent No. 328,852, dated October 20, 1885.

Application filed July 19, 1884. Serial No. 138,229. (No model.)

*To all whom it may concern:*

Be it known that I, PETER LOCKIE, of Rochester, in the county of Monroe and State of New York, have invented certain new and useful Improvements in Clothes-Driers; and I do hereby declare the following to be a full, clear, and exact description of the invention, such as will enable others skilled in the art to which it pertains to make and use it, reference being had to the accompanying drawings, which form part of this specification.

My invention relates to an improvement in clothes-driers; and it consists in the combination of the two posts, a pair of reels, which are placed upon each post, and the two endless ropes, wires, or bands, which are passed around the reels, the upper reels being made larger than the lower ones, so that the clothes hung upon the two lines will not come directly over each other, all of which will be more fully described hereinafter, and particularly pointed out in the claim.

The object of my invention is to provide a clothes-drier consisting of two pairs of reels, around which the endless ropes, belts, or wires are passed, the upper reels being the largest, so that the lines will not be in a line with each other, and thus cause the water from the clothes upon the upper line to drop upon those upon the lower one.

Figure 1:
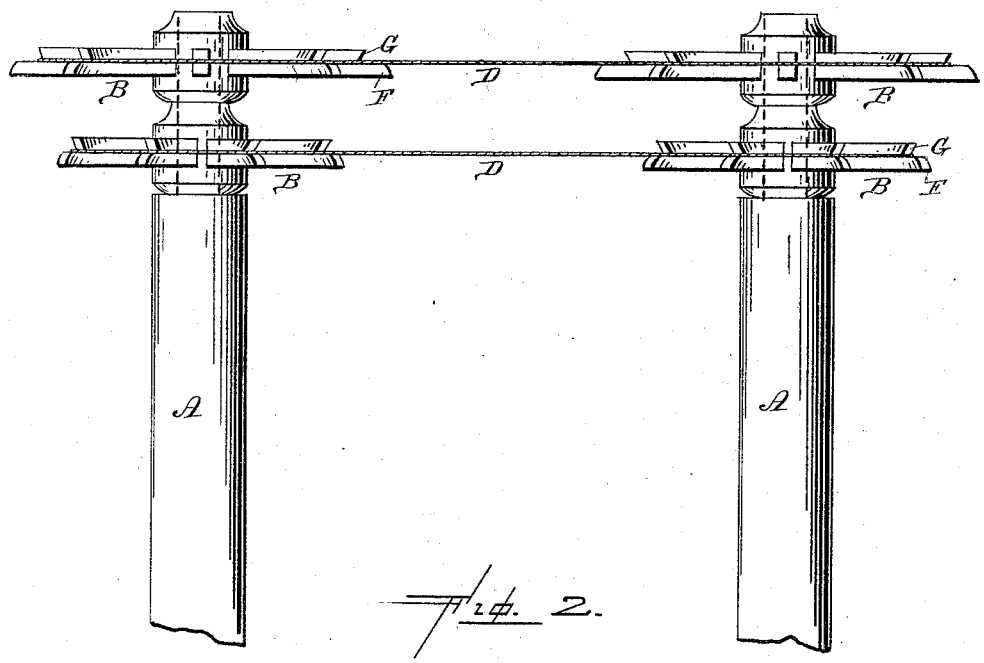
Figure 2:
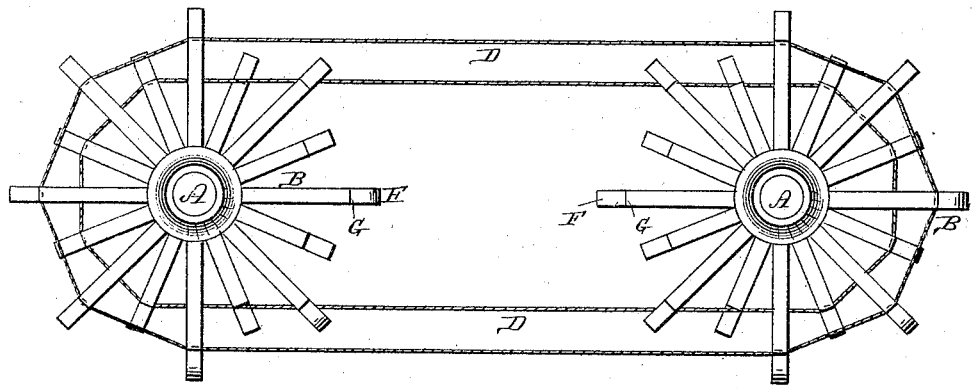

Figure 1 is a side elevation of a clothes-drier embodying my invention. Fig. 2 is a plan view of the same.

A represents the two uprights or standards, of any desired height, and upon the upper portion of each one of which are journaled the two reels B. Each reel consists of a hub, from which radiate the arms or spokes X, and around each pair of these reels are passed the endless lines or wires D. In order to prevent these lines or wires from becoming detached from the reels by the weight of the clothes upon them the outer end, F, of each reel is extended a suitable distance beyond the shoulder G, against which the wire or rope catches. The extended end of each arm then forms a support for the rope or wire, so that it cannot be detached from the arms, no matter what weight of clothes may be placed upon them.

If the reels were the same size, the wires or lines would come directly over each other, and then the drippings from the clothes upon the upper line would fall directly upon the clothes on the lower line. In order to obviate this the arms of the upper reels are made the longest, and are thus made to carry the lines or wires out beyond the lower line or wire, as shown in Fig. 2. By this construction the drippings from the clothes upon the upper line fall outside and beyond the clothes upon the lower one.

A person standing in one position can place each successive article upon the line without having to move about, by simply moving the line in either direction beyond her.

Having thus described my invention, I claim—

In a clothes-drier, the combination of the two pairs of reels of unequal size, the standards upon which they are placed, and the lines or wires which are passed around each pair of reels, whereby the line or wire upon one pair of reels is thrown out of line with the one on the other pair of reels, substantially as specified.

In testimony whereof I affix my signature in presence of two witnesses.

PETER LOCKIE.

Witnesses:
   GEO. TRUESDALE,
   F. W. AVERY.